US006685086B1

(12) United States Patent
Mackenzie et al.

(10) Patent No.: US 6,685,086 B1
(45) Date of Patent: Feb. 3, 2004

(54) SELF-SERVICE TERMINAL

(75) Inventors: Scott P. Mackenzie, Dundee (GB); Kenneth A. Nicoll, Dundee (GB)

(73) Assignee: NCR Corporation, Dayton, OH (US)

( * ) Notice: Subject to any disclaimer, the term of this patent is extended or adjusted under 35 U.S.C. 154(b) by 162 days.

(21) Appl. No.: 09/710,333

(22) Filed: Nov. 9, 2000

(30) Foreign Application Priority Data

Dec. 3, 1999 (GB) .............................................. 9928739

(51) Int. Cl.$^7$ .............................................. G06F 17/60
(52) U.S. Cl. .................. 235/379; 235/380; 705/43; 362/85
(58) Field of Search ................. 235/379, 380; 705/43; 364/408; 902/30, 41; 362/85, 29, 23

(56) References Cited

U.S. PATENT DOCUMENTS

| 4,134,537 A | * | 1/1979 | Glaser et al. | 235/379 |
|---|---|---|---|---|
| 4,804,830 A | * | 2/1989 | Miyagisima et al. | 235/379 |
| 4,884,199 A | * | 11/1989 | Boothroyd et al. | 235/379 |
| 4,961,142 A | | 10/1990 | Elliott et al. | |
| 5,154,014 A | * | 10/1992 | Groy et al. | 235/379 |
| 5,202,549 A | * | 4/1993 | Decker et al. | 235/379 |
| 5,243,174 A | * | 9/1993 | Veeneman et al. | 40/431 |
| 5,483,047 A | * | 1/1996 | Ramachandran et al. | 235/379 |
| 5,615,320 A | * | 3/1997 | Lavendel | 345/594 |
| 5,702,304 A | * | 12/1997 | Acres et al. | 463/29 |
| 5,845,256 A | * | 12/1998 | Pescitelli et al. | 705/4 |
| 5,920,297 A | * | 7/1999 | Alexander | 362/23 |
| 5,962,830 A | * | 10/1999 | Wallace | 235/381 |
| 5,966,696 A | * | 10/1999 | Giraud | 235/379 |
| 6,000,806 A | * | 12/1999 | Dallman | 362/85 |
| 6,042,003 A | * | 3/2000 | Bigge et al. | 235/379 |
| 6,061,666 A | * | 5/2000 | Do et al. | 362/29 |
| 6,158,867 A | * | 12/2000 | Parker et al. | 345/83 |
| 6,217,182 B1 | * | 4/2001 | Shepherd et al. | 362/85 |

FOREIGN PATENT DOCUMENTS

| EP | 0535417 | 4/1993 |
|---|---|---|
| WO | 9827533 | 6/1998 |

* cited by examiner

*Primary Examiner*—Diane I. Lee
*Assistant Examiner*—Kumiko C. Koyama
(74) *Attorney, Agent, or Firm*—Michael Chan

(57) ABSTRACT

A self-service terminal (10) includes an adaptable fascia (12). The fascia (12) has a first appearance when not in use, and a second, different appearance when a user has been identified by the terminal (10). This enables a card issuer to associate its corporate color scheme with a user, so that when the user operates the terminal (10), the terminal can adapt the fascia to present the color scheme of the card issuer in a method of use.

15 Claims, 3 Drawing Sheets

SELF-SERVICE TERMINAL

BACKGROUND OF THE INVENTION

The present invention relates to a self-service terminal (SST). In particular the invention relates to an automated teller machine (ATM).

In some countries, it is becoming common for ATMs to be owned by and located within retail outlets such as convenience stores. Typically, a retailer is given a fee for each transaction conducted on an ATM that the retailer owns. As these ATMs are owned by a retailer rather than by a financial institution, the retailer is able to choose any color scheme for the ATM. This has the disadvantage that a financial institution is not able to brand each ATM using its corporate color-scheme. Another disadvantage is that users may avoid certain ATMs because they do not like the particular color scheme that is used.

SUMMARY OF THE INVENTION

It is among the objects of embodiments of the present invention to obviate or mitigate one or more of these disadvantages or of other disadvantages associated with conventional SSTs.

According to a first aspect of the present invention there is provided a self-service terminal having a fascia characterized in that the fascia has an adaptable appearance so that the terminal is operable, on identifying a user, to modify the appearance of the fascia to an appearance associated with the user.

By virtue of this aspect of the invention a self-service terminal is operable to change its appearance once it identifies a user, thereby allowing, for example, a financial institution to brand a third party terminal while the terminal is being used by one of the financial institution's customers. This also allows the terminal to have a neutral appearance when not in use, and a multi-colored appearance when being used. This also allows the terminal to display different color schemes when the terminal is being operated by different users.

The appearance associated with the user may correspond to the corporate color scheme used by an institution with which the user is associated. Alternatively, the appearance associated with the user may be an appearance selected by the user, such as the color scheme of the user's favorite sports team.

The terminal may also have additional exterior panels that have an adaptable appearance so that the exterior panels can also present multiple color schemes depending on the identity of the user.

Preferably, once the user has been identified, the terminal is able to access data relating to the appearance associated with the user.

The data relating to the appearance associated with the user may be stored remotely from the terminal, for example, in an authorization server or host computer; alternatively, the data may be held locally in the terminal, or in an identification token, such as a magnetic stripe card or Smart card, retained by the user.

Preferably, the fascia comprises one or more at least partially translucent portions.

Preferably, the terminal adapts its appearance using one or more of a plurality of differently colored lights located behind the translucent portions. Alternatively, the terminal adapts its appearance using one or more materials that have a color that is dependent on a voltage applied to the material.

The appearance associated with a user may comprise a single color scheme, or may comprise a plurality of color schemes, so that one color scheme is displayed for a first time period, and then a second color scheme is displayed for a second time period. The second color scheme may be that chosen by the user.

The terminal may be an ATM.

According to second aspect of the present invention there is provided a method of adapting the appearance of a fascia of a self-service terminal characterized by the steps of: providing the fascia with a first color scheme; identifying a user; retrieving information relating to a color scheme associated with that user; and changing the appearance of the fascia from the first color scheme to the retrieved color scheme.

The method may comprise the further step of: on detecting a user having completed a transaction, reverting to the first color scheme.

BRIEF DESCRIPTION OF THE DRAWINGS

These and other aspects of the present invention will now be apparent from the following specific description, given by way of example, with reference to the accompanying drawings in which.

DETAILED DESCRIPTION

Figure 1:
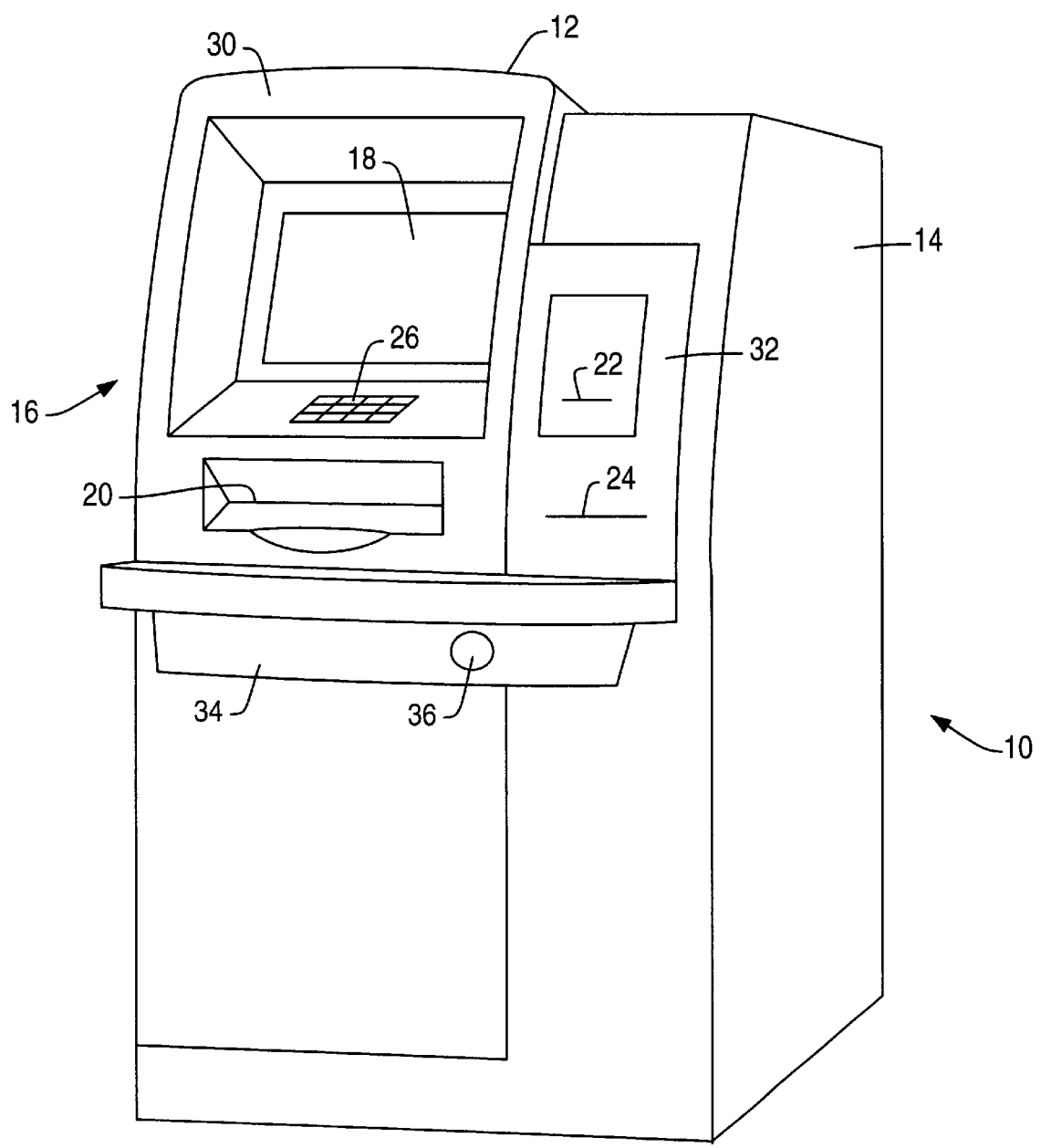
FIG. 1 is a perspective view of a self-service terminal according to one aspect of the present invention.

Referring to FIG. 1, an SST 10 in the form of an ATM is shown in accordance with an embodiment of the present invention. The ATM 10 comprises a fascia 12 pivotally mounted to a chassis (not shown) for supporting exterior panels 14 and internal ATM modules (not shown). The fascia 12 incorporates a user interface 16. The fascia 12 defines a plurality of apertures so that when the fascia 12 engages fully with the chassis and panels 14, the apertures align with user interface elements located within the ATM 10.

The fascia 12 includes a display aperture 18 for aligning with a display, a cash dispense aperture (or slot) 20 for aligning with a cash dispenser, a card reader aperture (or slot) 22 for aligning with a motorized card reader module, and receipt printer aperture (or slot) 24 for aligning with a receipt printer. The fascia 12 also includes an encrypting PIN pad 26.

The fascia 12 comprises three translucent portions: a display portion 30 surrounding the display aperture 18 and the cash dispense slot 20; a card reader portion 32 surrounding the card reader slot 22 and receipt slot 24; and a lock portion 34 generally surrounding a lock mechanism 36 used to release the fascia 12 from the chassis and panels 14.

Figure 2:
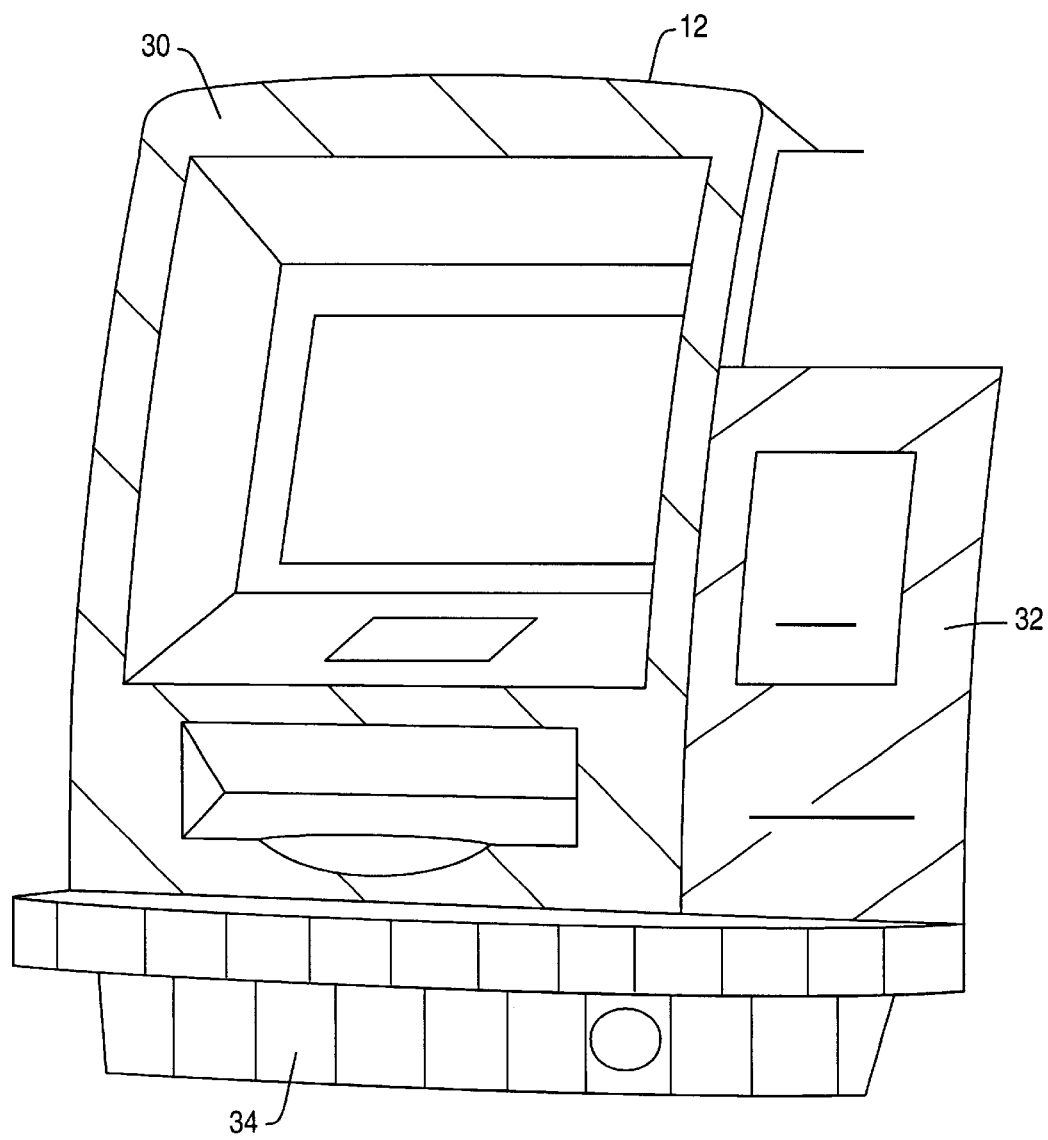
FIG. 2 is a perspective view of the fascia of the terminal of FIG. 1.

Referring to FIG. 2, which shows the fascia 12 of FIG. 1, each translucent portion 30,32,34 may be back-lit with a different color, this is illustrated in FIG. 2 by a different hatching used for each portion 30,32,34.

Figure 3:
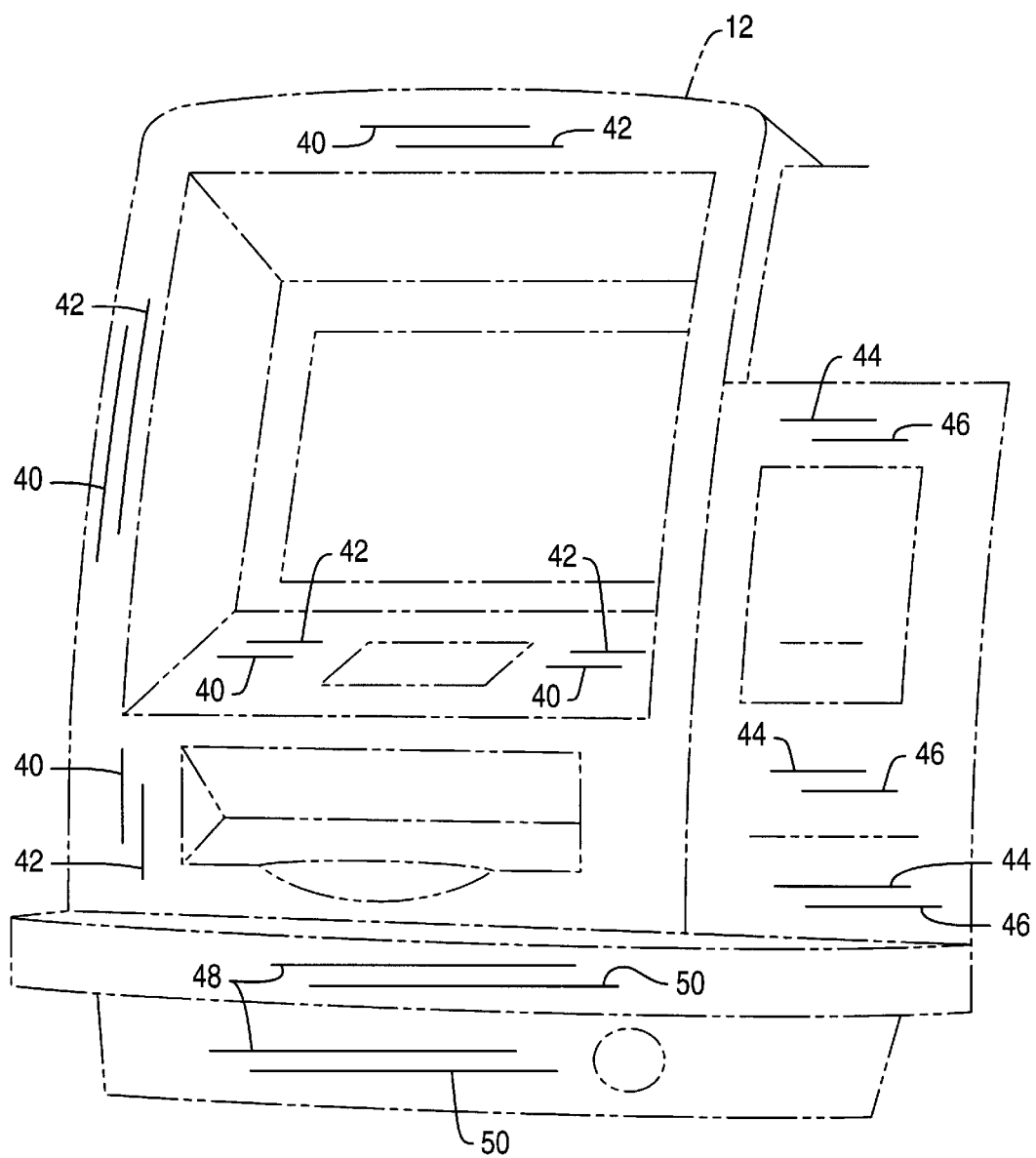
FIG. 3 is a perspective view illustrating the lighting arrangement behind the fascia of FIG. 2.

FIG. 3, which shows the fascia 12 in dotted line and lights located behind the fascia 12 to illuminate the translucent portions 30,32,34, behind the display portion 30 there are two sets of lights, one set 40 emits blue light, the other set 42 emits red light. The lights are arranged in pairs of different colored lights, so that a red light 42 is located next to a blue light 40. This enables an ATM controller (not shown) to energize either blue lights or red lights to illuminate the display portion 30 and thereby give the portion 30 either a blue or a red appearance.

Similarly, behind the card reader portion 32 are two sets of lights, one set 44 emits green light, the other set 46 emits blue light, so that portion 32 can be controlled to have a green or a blue appearance.

Similarly, behind the lock portion 34 are two sets of lights, one set 48 emits green light, the other set 50 emits red light, so that portion 32 can be controlled to have a green or a red appearance.

When a financial institution provides a user with a magnetic stripe card, the institution writes a color scheme code to the magnetic stripe in addition to the account details.

When this user inserts the magnetic stripe card into the card reader slot 22 (FIG. 1), the ATM 10 reads the card and invites the user to enter a PIN using keypad 26 (FIG. 1), as for a conventional ATM transaction.

The ATM 10 also reads the color scheme code from the magnetic stripe card. The ATM 10 then activates the appropriate sets of lights for that color scheme. For example, if the color scheme is blue, green, and red, then the display portion 30 is illuminated with blue lights 40, the card reader portion 32 is illuminated with green lights 44, and the lock portion 34 is illuminated with red lights 50; so that the fascia has one portion for each color. When the transaction is complete, the ATM 10 de-activates the lights so that the fascia returns to its original appearance.

Various modifications may be made to the above described embodiment within the scope of the invention, for example, the fascia 12 may have more than three translucent portions. In other embodiments, more than two sets of lights may be available for illuminating each portion. In other embodiments, the color scheme presented by the ATM may vary during a transaction. In other embodiments, the user may be allowed to choose his or her own color scheme. In other embodiments, side panels of the ATM may also be illuminated. In other embodiments, the portions 30,32,34 may be made from thermochromic material, or may have a thermochromic layer applied to them, so that the color of each portion can be controlled by applying a voltage to the portion. In other embodiments, the SST may be an information kiosk.

What is claimed is:

1. A self-service terminal comprising:
   means for identifying a user;
   a display;
   a fascia adjacent to the display and including a number of fascia portions;
   first lighting means for providing light of a first color to illuminate a fascia portion with the first color;
   second lighting means for providing light of a second color which is different from the first color to illuminate a fascia portion with a second color;
   means for retrieving from a data storage medium data which is representative of a color scheme based upon a user's identity; and
   means for controlling the first and second lighting means in accordance with the color scheme to illuminate at least one fascia portion.

2. A terminal according to claim 1, wherein the fascia portion illuminated by the first lighting means is different from the fascia portion illuminated by the second lighting means.

3. A terminal according to claim 2, wherein one fascia portion surrounds the display, and another fascia portion surrounds a card reader slot.

4. A terminal according to claim 1, wherein each fascia portion comprises a translucent fascia portion.

5. A terminal according to claim 1, further comprising third lighting means for providing light of a third color which is different from the first and second colors, and wherein the controlling means controls the first, second, and third lighting means in accordance with the color scheme to illuminate at least one fascia portion.

6. A terminal according to claim 5, wherein the first lighting means provides blue light, the second lighting means provides green light, and the third lighting means provides red light.

7. A self-service terminal comprising:
   means for identifying a user;
   a display;
   a fascia adjacent to the display and including a number of fascia portions;
   an energizeable first light source for, when energized, emitting light of a first color to illuminate a fascia portion with the first color;
   an energizeable second light source for, when energized, emitting light of a second color which is different from the first color to illuminate a fascia portion with a second color; and
   a controller for (i) retrieving from a data storage medium data which is representative of a color scheme based upon identity of a user, and (ii) controlling energization of the first and second light sources based upon the retrieved color scheme to illuminate at least one fascia portion.

8. A terminal according to claim 7, wherein the fascia portion illuminated by the first light source is different from the fascia portion illuminated by the second light source.

9. A terminal according to claim 8, wherein one fascia portion surrounds the display, and another fascia portion surrounds a card reader slot.

10. A terminal according to claim 7, wherein each fascia portion comprises a translucent fascia portion.

11. A terminal according to claim 7, further comprising an energizeable third light source for, when energized, emitting light of a third color which is different from the first and second colors, and wherein the controller controls energization of the first, second, and third light sources based upon the color scheme to illuminate at least one fascia portion.

12. A terminal according to claim 11, wherein the first light source emits blue light when energized, the second light source emits green light when energized, and the third light source emits red light when energized.

13. A method of adapting appearance of a fascia adjacent to a display of a self-service terminal, the method comprising:
   identifying a user;
   retrieving data which is representative of a color scheme based upon identity of the user; and
   selectively illuminating at least a portion of the fascia with a first color and a second color which is different from the first color based upon the retrieved data to adapt appearance of the fascia for the particular user.

14. A method according to claim 13, wherein the retrieved data comprises a color scheme code stored on a card belonging to the user.

15. A method according to claim 13, further comprising:
   detecting when the user has completed a self-service transaction; and
   discontinuing selective illumination of the fascia when completion of the self-service transaction is detected.

* * * * *